United States Patent [19]

Rabe

[11] Patent Number: 5,832,079
[45] Date of Patent: Nov. 3, 1998

[54] ACOUSTIC HORN FOR USE IN CELLULAR FLIP PHONES

[75] Inventor: Karl W. Rabe, Chapel Hill, N.C.

[73] Assignee: Ericsson Inc., RTP, N.C.

[21] Appl. No.: 642,746

[22] Filed: May 3, 1996

[51] Int. Cl.⁶ .................................................. H04M 1/00
[52] U.S. Cl. ........................................ 379/433; 379/434
[58] Field of Search .................................. 379/433, 428, 379/434; 455/90, 575

[56] References Cited

U.S. PATENT DOCUMENTS

| | | | |
|---|---|---|---|
| 1,818,654 | 8/1931 | Steuart . | |
| 3,249,873 | 5/1966 | Whittmore, Jr. . | |
| 3,748,583 | 7/1973 | Andersen et al. | 327/353 |
| 4,171,734 | 10/1979 | Peveto et al. | 181/192 |
| 4,926,961 | 5/1990 | Gatttey et al. | 181/22 |
| 5,282,245 | 1/1994 | Anderson | 379/433 |
| 5,384,844 | 1/1995 | Rydbeck | 379/433 |

FOREIGN PATENT DOCUMENTS 0275996   1/1988   European Pat. Off. ......... H04M 1/02

OTHER PUBLICATIONS

Product Brochure CEL 4000 Ericsson Cellular Phone © Dec. 1995 Ericsson Inc., Research Triangle Park, North Carolina 27709.

Product Brochure CEL 4001, Digital Cellular Phone © Dec. 1995 Ericsson Inc., Research Triangle Park, North Carolina 27709.

Hanna, R.C. et al, "The Function and Design of Horns for Loudspeakers," Trans. AIEE, vol. 44 (Feb. 1924): 393–404.

*Primary Examiner*—Jack Chiang

[57] ABSTRACT

A pivotable flip element for use with hand-held radiophone units is specially configured to provide highly efficient coupling of acoustic energy into and out of the radiophone by virtue of an acoustic horn precisely formed as an interior cavity of the planar pivotable element. When arranged as a device for coupling acoustic energy into a microphone fixedly mounted to the radiophone housing, incident sound is directed from the horn mouth to its throat section, and thereafter through a rotary acoustic joint to an input channel to the microphone. The continuously rotatable rotary joint accommodates flip element rotations, allowing for the dualpurpose operations of protecting and covering the radiophone keyboard when not in use, and efficient input sound coupling when deployed.

9 Claims, 1 Drawing Sheet

ACOUSTIC HORN FOR USE IN CELLULAR FLIP PHONES

TECHNICAL FIELD

The present invention relates generally to the coupling of acoustic energy into and out of electronic devices, and more particularly to specially formed and articulated passive acoustic elements advantageously coupled to active acoustic transducers to provide improved electroacoustic operation of and mechanical protection for radiophones embodying the acoustic elements.

BACKGROUND

Acoustic transducers of all types for use in audio communication systems have a long history of development. To a large degree, the race between improvements in transducer characteristics and the adaptations of electronic circuitry to optimally interface with any given transducer has proven to be a virtual marathon. Early microphones and speakers based largely on mechanical principles gave way to variable resistance/variable electromagnet types that better lent themselves to improved amplification and frequency response performance. Often times, the transducer types and characteristics were adapted to exploit newly available capabilities of electronic devices—low noise FETs (high impedance), feedback networks (passband tailoring), and current mirror amplifiers (low impedance). With the advent of highly sophisticated cellular radiophone systems with their dramatically improved signal-to-noise ratios, the acoustic quality of their input and output audio devices has come under close scrutiny. So have their costs. The combination of an inexpensive passive acoustic device intimately coupled to an input microphone (or output speaker) associated with high quality radiophone units as taught in the present invention provides significantly improved technical and operational performance of its associated radio communication system.

Descriptions of typical prior art approaches to acoustic coupling techniques for use with electronic devices may be found in a number of U.S. patents. Regarding the overall concept of combining an acoustic horn as the output device for a portable radio, see U.S. Pat. No. 3,748,583 to Anderson et al. In particular therein, note the use of a folded hyperbolic acoustical horn for directing audio toward a user.

European Patent 0 275 966 to Schön et al. discloses the inclusion of a sound-carrying conduit into a movable flap element used to cover the control pad of a telephone handset. The conduit is tapered to route input speech to a microphone within the handset via an admitting opening that aligns with the microphone input only with the flap opened to its maximum. No structural details of the sound-carrying conduit are given.

U.S. Pat. No. 1,818,654 to Steuart discloses the use of a funnel-like mouthpiece which is coupled to an early (1931) telephone microphone via two rotating joints. The two joints allow both vertical and horizontal adjustability of a circular input opening via several tapered cylindrical tubes.

Other U.S. patents of general interest for their showings of acoustic horn structures or radiophone input sound I/O techniques are U.S. Pat. No. 5,384,844 to Rydbeck, 4,171,734 to Peveto et al, and 3,249,873 to Whitemore, Jr., et al.

Beyond the patent literature, the published technical literature also provides useful description regarding the desirable attributes of exponential horns for sound propagation. In particular, a 1924 A.I.E.E. article authored by C. R. Hanna et al. is of interest for its teaching of the theoretical considerations pertaining to the design of acoustic horns for best sound propagation.

OBJECTS OF THE INVENTION

It is therefore a primary object of the present invention to provide improved methods and apparatus for coupling acoustic energy into or out of electronic devices.

A further object of the present invention is to provide methods and apparatus for implementing an improved acoustic coupling capability based on a dual-purpose pivotable acoustic element.

A yet further object of the present invention is to provide an acoustic horn formed as an interior cavity within a pivotable flip element configured for use as the input or output acoustic coupling element associated with a radiophone device.

In a preferred embodiment, a flared acoustic horn of the exponential type is formed as an interior cavity within a flat, planar flip element associated with a cellular radiophone unit. The flip element is dual purpose, providing its conventional function of protecting and covering the radiophone user-activated dialing/ function keys in a first, closed position—and additionally constituting a highly efficient input acoustic coupling device via an acoustic rotary joint. The two aspects operating together provide a new operating mode combining physical protection and low cost, highly efficient input acoustic coupling to produce an improved radiophone unit.

BRIEF DESCRIPTION OF THE DRAWINGS

Additional objects and advantages of the invention will become apparent to those skilled in the art as the description proceeds with reference to the accompanying drawings wherein:

FIG. 3 is a perspective view of a flip cover (partially in phantom) showing additional mechanical and acoustic details of another alternate acoustic horn arrangement.

BEST MODE FOR CARRYING OUT THE INVENTION

Figure 1:
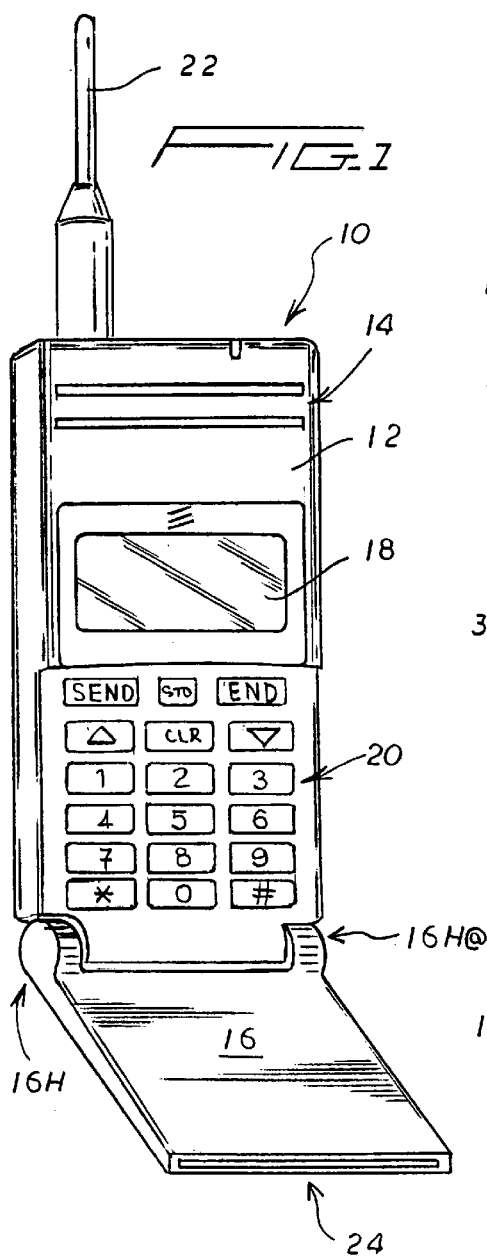
FIG. 1 is a perspective view of a hand-held cellular radiophone unit embodying a flared acoustic horn as its acoustic input coupling element according to the present invention.

Referring now to FIG. 1 there is shown a perspective view of a hand-held cellular phone unit embodying an acoustic horn as an input acoustic coupling element according to the present invention. The overall phone unit 10 is housed within a casing 12 having apertures 14 for radiating sound from an internally mounted speaker (not shown). The casing 12 carries a dual-purpose flip cover 16 pivotably mounted at its lower end and formed to include a flared acoustic horn that serves as an input energy coupling element for a microphone used with a transceiver disposed within the casing 12. The phone unit 10 further includes a display unit 18, a control key section 20 with the user-actuated key surfaces disposed in a key surface plane, and an antenna 22—all as well known and conventionally constructed. Cellular phone units readily adapted for incorporating the unique features provided by the present invention are described in an Ericsson Inc. (of Research Triangle Park, N.C. Product Bulletin CEL4000 © 1995 and CEL4001 © 1995. The flip cover 16 is shown as pivoted to its deployed position via a pair of hinges 16H and 16@, and as having an input mouth aperture 24. When the phone unit is not in active use, the flip cover 16 may be pivoted to its closed position so as to closely cover and protect the control keys 20.

Figure 2:
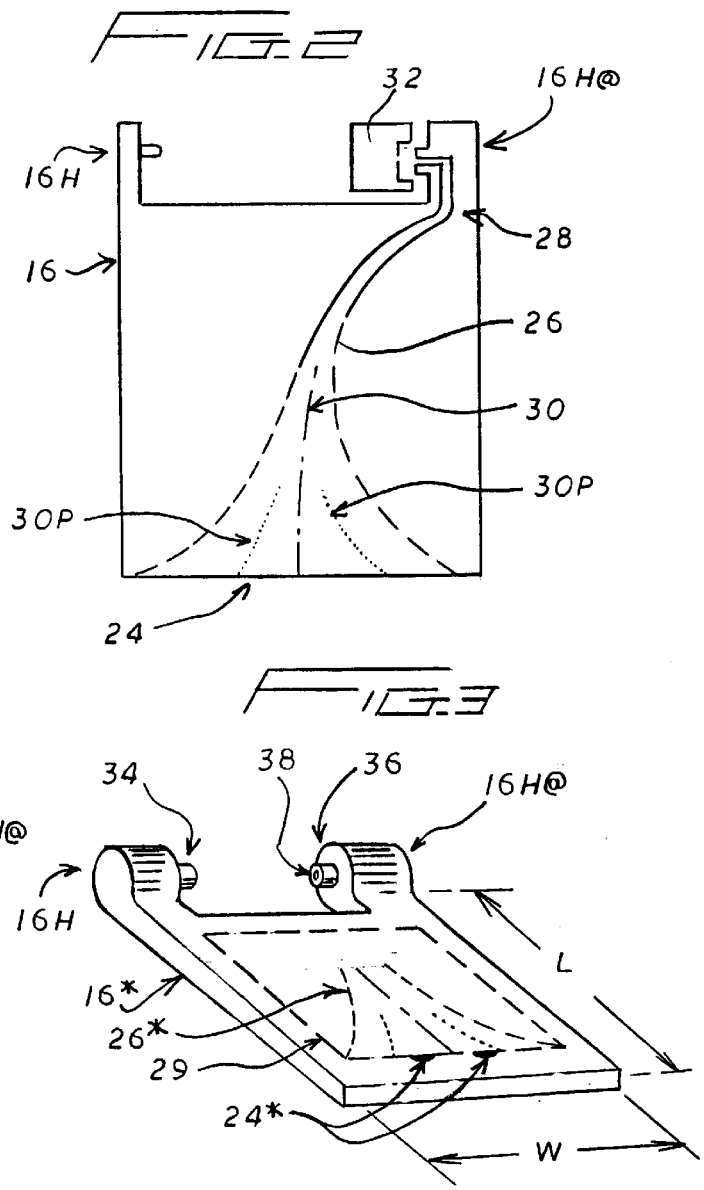
FIG. 2 is a plan view of an illustrative, basic acoustic horn in highly schematic form adapted to be formed into a flip cover of a radiophone unit.

FIG. 2 is a plan view of an illustrative, basic acoustic horn in highly schematic form, specially configured for being formed into the flip cover 16. The sound collecting and channeling acoustic horn itself is formed as a flared cavity 26 within the cover 16, having a mouth or aperture end 24, and a throat end 28. At any point along the curved central axis 30 of the horn, between the mouth 24 and the throat 28, the incident sound pressure is at some intermediate value between its greatest pressure at the throat and its least pressure at the mouth. The actual manner in which the sound pressure varies is dependent on the rate of growth of its cross-sectional area. This cross-sectional growth is determined by the law under which the horn expands. In a preferred embodiment hereof, expansion is contemplated as being of the exponential type. As an exponential device, the horn 26 serves as a remarkably efficient impedance matching means between the source of the incident acoustic energy (or sound) at its mouth and its throat. When the throat 28 is properly routed via a suitable rotating acoustic joint 16@ to a microphone 32, the phone unit 10 of FIG. 1 is ideally adapted to provide its unique benefits to a cellular phone user.

Operationally, the basic exponential horn 26 may be configured to exhibit high frequency cutoff in the range of 3–5 kHz, and both rising to flat response curves may be obtained. By use of suitably positioned dampening elements, such as thin layers or discrete portions of foam/elastomeric materials (not shown), the actual operating characteristics of the horn 26 may be made to closely approach theoretically expected values.

Other acoustic horn types are contemplated for use in implementing the present invention. These may include horns of the conical type, parabolic type, hyperbolic type, plus other shapes and types.

Figure 2A:
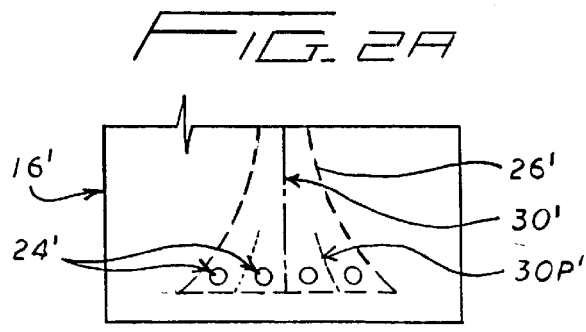
FIG. 2A is a fragmentary plan view of an alternate acoustic horn arrangement for use with the present invention.

FIG. 2A shows an alternate embodiment of an acoustic horn and its acoustic input arrangement which may be advantageously employed in the present invention. A modified horn 26' is formed as previously described into a flip cover 16', but has the acoustic input to its mouth or aperture end displaced to the top surface of the flip cover 16' in the form of a plurality of suitably sized and shaped openings 24'. Therefore, the length of the horn 26' stops a small distance short of the end of the flip 16', and the input acoustic energy is coupled into the horn via the top openings 24'—in lieu of the edge aperture 24 shown in FIG. 2. A number of small partition-like structures may extend between the upper and lower flip surfaces to provide strengthening of the horn in the vicinity of the openings 24'—all of which provides an enhanced input arrangement for this alternate embodiment. Additional description of the partition-like structures will be described below in connection with the description of FIG. 4.

With brief reference to FIG. 3, additional mechanical and acoustic details of another alternate embodiment of the flip cover and its modified internal acoustic horn are provided. The cover 16* is generally planar in shape and is formed as a thin, flat member with a pair of hinge elements at one end. A pair of axial hinge pins 34 and 36 guide the rotation of the cover 16*, with pin 36 carrying an interior coaxial opening or channel 38 for routing the throat sound pressure to a microphone (not shown) mounted in the body of the phone unit 10. In a particularly preferred embodiment, the flared horn 26* is (as is the flared horn 26' of FIG. 2A) rectangular in cross section and may extend up to 60 mm (about 2.3 inches) in length L from throat to mouth, not including a short transition channel connecting the throat 28 to the channel 38. Its aperture or mouth width W may be 40 mm (about 1.6 inches), and its aperture or mouth height H may be 1–2 mm. The physical extent and shape of the horn 26* are substantially the same as those of 26' of FIG. 2A; many of the identifying legends have been omitted to provide an uncluttered illustration. Phantom lines suggest the general outline of the horn 26* as well as a thin, rectangular cover element 29. One or more input openings 24* (two shown, illustratively) serve to couple the incident acoustic energy into the mouth of the horn 26*. The opening(s) 24* are formed into the top surface of the flip 16* so as to extend slightly beyond the edge of the cover 29.

For positive mechanical action, the hinge pivot pin areas may include suitable detenting means operative in combination with mating structures formed into the casing 12. For loss free coupling of acoustic pressure from the horns 26, 26', or 26* to the microphone 32, appropriate sealing means are called for. In the interest of simplicity of exposition, detenting and sealing means are not shown, their design and construction being well known.

The flip covers 16, 16', or 16* may be made of any of a number of high impact plastic materials. A particularly desirable feature of these plastics is their ability to be precision formed using existing and low cost manufacturing techniques. Thus, the interior cavity forming the outer boundaries of the various horn 26 embodiments may be precisely and highly smoothly formed, thereby achieving highly efficient acoustic coupling structures.

Figure 4:
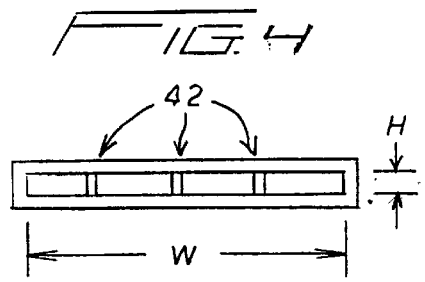
FIG. 4 shows an alternate embodiment of an acoustic horn structure by way of an elevational view of the basic horn mouth.

Additional operating efficiency may be obtained in certain operating environments by use of the auxiliary horn structures suggested in FIG. 4. A plurality of thin partitions 42 inserted into the horn mouth 24 and extending for a significant fraction of the horn length divides the horn's input region into a number of smaller elementary sections. The length of these illustrative partitions is shown by the extent of the dotted lines 30P of FIG. 2. The partitions 42 function both to shape the directivity of the horns 26 by lessening their sensitivity to acoustic energy arriving at highly oblique angles, as well as to provide physical strengthening to flip covers 16. When employed primarily for strengthening, as in the embodiment of FIG. 3, their physical length may be somewhat lessened.

Although the invention has been described in terms of selected preferred embodiments, the invention should not be deemed limited thereto, since other embodiments and modifications will readily occur to one skilled in the art. For example, the description herein has set forth the use of an acoustic horn to couple incident sound to a microphone fixed to the housing of a radiophone device via a rotary acoustic joint. Clearly, acoustic reciprocity dictates that the methods and apparatus taught in the present invention are equally applicable to routing the output sound from interiorly mounted electromagnetic transducers via a rotary acoustic joint to an output acoustic horn. Thus, the transducer and horn together, through the rotary joint, would constitute a sound producing and directing speaker. Also, while the microphone 32 of FIG. 2 is shown as being mounted in close proximity to the throat of the horn 26, this need not be the case. So the microphone may be mounted in any convenient place within the radiophone unit by merely repositioning and/or extending the interconnecting acoustic path; and the size, shape, and locations of the input openings on the top surface of the flip cover may be varied for optimum performance, appearance, and user acceptance. It is therefore to be understood that the appended claims are intended to cover all such modifications as fall within the true spirit and scope of the invention.

I claim:

1. A radiotelephone including an axial acoustic coupler for pivotally connecting a main body portion of the radiotelephone to a flip and for channeling sound from the flip into the main body of the radiotelephone, comprising:

a) a radiotelephone having a main body portion, a microphone disposed in the main body portion, and a flip pivotally connected to the main body portion;

b) an acoustic horn formed as a shaped cavity interiorly of the flip, the acoustic horn having mouth and throat sections;

c) an acoustic coupler for pivotally coupling the flip to the main body portion of the radiotelephone and for channeling sound energy from the throat section of the acoustic horn into the main body of the radiotelephone where the sound can be directed to the microphone disposed therein; and d) the acoustic coupler including at least one hinge pin for physically hinging a portion of the flip to a portion of the main body of the radiotelephone, and wherein the hinge pin includes an axial sound channel communicatively connected to the throat section of the acoustic horn for channeling sound from the acoustic horn into the main body of the radiotelephone such that sound emitted from the throat section of the acoustic horn is directed axially through the sound channel and the hinge pin.

2. The radiotelephone of claim 1 wherein a cross-sectional area of said acoustic horn expands exponentially from the throat to the mouth along a curved central horn axis.

3. The radiotelephone of claim 2 wherein said flip includes one or more apertures formed into its upper surface for coupling incident acoustic energy into said acoustic horn.

4. The radiotelephone of claim 1 wherein the mouth of said acoustic horn further includes means for modifying horn input directivity.

5. The radiotelephone of claim 3 wherein said directivity modifying means comprises at least one partitioned element extending into the horn mouth along at least one line generally aligned with said curved central horn axis.

6. The radiotelephone of claim 1 wherein said radiotelephone includes user actuated keys positioned in a key plane and wherein said flip is pivotable to be disposed adjacent to and parallel with said key plane to cover and protect said keys.

7. The radiotelephone of claim 1 wherein the flip is continuously pivotable for angles less than 180° and wherein the acoustic coupler is operative to channel sound from the acoustic horn into the main body of the radiotelephone throughout the angle of rotation of the flip.

8. A method of axially channeling sound through a hinge pin that pivotally connects a portion of the main body of a radiotelephone to a portion of the flip, comprising: pivotally connecting a portion of the main body of the radiotelephone to the portion of the flip via the hinge pin such that the flip can be pivoted back and forth about an axis of the hinge pin; routing sound from a mouth section of an acoustic horn formed in the flip to a throat section of the horn; directing sound from the throat section of the acoustic horn into and axially through a sound channel formed in the hinge pin and into the radiotelephone where the sound can be directed to a microphone disposed within the radiotelephone; and wherein the hinge pin and the axial sound channel formed therein are operative to channel sound therethrough throughout the pivotable range of movement of the flip with respect to the main body of the radiotelephone.

9. The method of claim 8 wherein the axial sound channel is formed internally within the hinge pin and extends completely through the hinge pin.

* * * * *